(12) United States Patent
Loth-Krausser et al.

(10) Patent No.: US 9,973,020 B2
(45) Date of Patent: May 15, 2018

(54) METHOD FOR CHARGING A RECHARGEABLE BATTERY OF AN ELECTRIC DEVICE

(71) Applicant: The Gillette Company, Boston, MA (US)

(72) Inventors: Hartmut Loth-Krausser, Stockstadt am Rhein (DE); Mathias Amann, Darmstadt (DE); Christian Wachter, Darmstadt (DE); Holger Hild, Idstein (DE)

(73) Assignee: The Gillette Company, Boston, MA (US)

( * ) Notice: Subject to any disclaimer, the term of this patent is extended or adjusted under 35 U.S.C. 154(b) by 124 days.

(21) Appl. No.: 14/856,890

(22) Filed: Sep. 17, 2015

(65) Prior Publication Data

US 2016/0087463 A1 Mar. 24, 2016

(30) Foreign Application Priority Data

Sep. 23, 2014 (EP) .................................... 14185989

(51) Int. Cl.
*H02J 7/00* (2006.01)
*H02J 7/04* (2006.01)

(52) U.S. Cl.
CPC .......... *H02J 7/0093* (2013.01); *H02J 7/0091* (2013.01); *H02J 7/045* (2013.01); *H02J 7/047* (2013.01)

(58) Field of Classification Search
CPC ........ H02J 7/007; H02J 7/0093; H02J 7/0044; H02J 7/0072; H02J 7/0073; H02J 7/0075;
(Continued)

(56) References Cited

U.S. PATENT DOCUMENTS 6,307,353 B1 * 10/2001 Shiojima ............... H01M 10/44
320/139
7,449,862 B1 * 11/2008 Voor ..................... H02J 7/0068
320/107

(Continued)

OTHER PUBLICATIONS

PCT International Search Report with Written Opinion in corresponding Int'l Appln. PCT/US2015/057317 dated Nov. 26, 2015.

*Primary Examiner* — Drew A Dunn
*Assistant Examiner* — Michael Dibenedetto
(74) *Attorney, Agent, or Firm* — Ronald T. Sia; Kevin C. Johnson; Steven W. Miller

(57) ABSTRACT

A method for charging a rechargeable battery (3) of an electric device in different charging steps applying different charging currents is described, said charging steps comprising at least:
a first charging step applying a first constant charging current (I1) to the battery (3) while the battery voltage is smaller than a first voltage threshold (V1) and/or while the battery temperature is smaller than a first temperature threshold, said first charging (I1) current being smaller than a second charging current (I2);
a second charging step applying said second constant charging current (I2) to the battery (3) while the battery voltage is higher than said first battery voltage threshold (V1) and lower than a second battery voltage threshold (V2) and/or while the battery temperature is higher than said first temperature threshold and smaller than a second temperature threshold;
a third charging step applying a constant charging current (I3) to the battery (3), wherein said third constant charging current (I3) is switched on every time when the battery voltage drops to a fourth voltage threshold (V4) and switched off when the battery voltage reaches
(Continued)

a fifth voltage threshold (V5), and wherein said third charging step providing said repeated switching on and off the third constant charging current (I3) thereby producing current pulses ends if the length of a current pause (Toff) following said current pulse (Ton) equals or exceeds the length of p·(k−1)−times the preceding current pulse (Ton) with k being the ratio of constant charging current I3 and the constant charging current I1 and p being a defined factor.

9 Claims, 2 Drawing Sheets

(58) Field of Classification Search
CPC ........ H02J 7/0076; H02J 7/0077; H02J 7/008; H02J 7/0083; H02J 7/0088; H02J 7/0008; H02J 7/0057
USPC .................................................. 320/160–162
See application file for complete search history.

(56) References Cited

U.S. PATENT DOCUMENTS

| | | | |
|---|---|---|---|
| 7,528,574 B1 * | 5/2009 | Adkins | H01M 10/44 320/128 |
| 2006/0164035 A1 * | 7/2006 | Van Beek | B60L 11/1816 320/107 |
| 2009/0085515 A1 * | 4/2009 | Bourilkov | H02J 7/0024 320/117 |
| 2009/0309423 A1 * | 12/2009 | Utsumi | H02J 7/0093 307/66 |
| 2014/0203762 A1 * | 7/2014 | Kato | H02J 7/0031 320/107 |
| 2014/0203763 A1 | 7/2014 | Zhao et al. | |
| 2015/0002105 A1 * | 1/2015 | Kelly | G01R 31/3662 320/162 |

* cited by examiner

METHOD FOR CHARGING A RECHARGEABLE BATTERY OF AN ELECTRIC DEVICE

FIELD OF THE INVENTION

The invention relates to the charging of a rechargeable battery of an electric device such as a shaver, an epilator, a mixer, a toothbrush or the like appliance used regularly in daily life for quite a short period during the day. Such appliances are also called household appliances which generally differ from normal electric appliances in that they are normally used only for short periods during one day. Short periods cover time periods from 1 to 15 minutes. Most of the use occurs in time periods between 1 to 5 or 1 to 10 minutes. The frequency of use per day is typically in the range of 1 to 15 times of use per day. Often, the times of use per day are below 5 or 10).

BACKGROUND OF THE INVENTION

It is known to charge the rechargeable or secondary battery of an electric device, in particular of a household appliance, in different charging steps applying different charging currents. Due to the normal usage behavior, the charging steps regularly differ from standard charging methods, such as cc-cv (constant current-constant voltage) charging methods.

In a first step, the loading occurs with a low current of e.g. $\frac{1}{10}$ C. C refers to the (total) capacity of the rechargeable battery, e.g. 1000 mAh. With a charging current of 1 C, the rechargeable battery would be completely charged after one hour. Accordingly, with a capacity of 1000 mAh, charging with 1 C would lead to a current of 1000 mA. The first step of charging is followed by a second step in which the loading occurs with a high current, e.g. a current of about 1 C. This charging is normally performed until a voltage threshold and/or a temperature threshold of the battery is reached. In a third step, the battery is charged with a pulsed charging current.

The voltage threshold, the value of the charging current and the internal resistance of the battery determine the status of charge that can be maximally reached. For Lithium-ion batteries the reachable status of charge with this charging method is usually smaller than with a standard cc-cv charging method.

With deterioration (aging) of the battery its internal resistance is increasing. In consequence, the maximum reachable status of charge is decreasing with the life time of the battery. This means that in particular for Lithium ion batteries less electric charge can be loaded during the charging process though the capacity in the battery would still be available. The reason is that the voltage threshold is reached earlier due to the increased internal resistance. In turn, the runtime of the device or appliance decreases with the lifetime of the battery because the
  theoretically available electric capacity of the battery is not used.

The same is valid at low ambient temperatures as the internal resistance of the battery increases with decreasing temperature of the battery.

In case of a high internal resistance due to low ambient temperature of e.g. 5° C. and a high pulsed charging current in the third charging step, a respective voltage threshold for terminating the charging pulse might be reached even upon switching on the pulsed charging current. As a result, no effective charging occurs in said third charging step.

The same effect leads to higher voltage pulses or jumps upon switching on the current pulses in the third charging step. Further, the frequency of switches the current pulses is increased. This might lead to a worse electromagnetic compatibility (EMC) or a respective technical and cost effort to avoid the deterioration of the electromagnetic compatibility.

Further, if a device or appliance is not removed form the mains or switched on after a charging process a pulsed charging current might be provided with a reduced switching-off voltage threshold in order to just compensate for the consumption of the standby current of the device or appliance and/or the self-discharging of the battery. This leads to retention of the status of charge. Having a high internal resistance due to any of the before mentioned effects, the reduced switching-off voltage might be reached immediately upon switching on the current pulse. In this case the charging of the battery might not compensate for the standby current or the self-discharging any more.

It is accordingly an object of the present invention to improve a charging method in particular for household appliances or electric devices which generally are used only for short periods during one day. In particular, a charging method shall be provided that can also be used for Lithium-ion batteries.

SUMMARY OF THE INVENTION

Accordingly, the present invention proposes a method for charging a rechargeable battery of an electric device in different charging steps applying different charging currents, said charging steps comprising at least:

a first charging step applying a first constant charging current $I1$ to the battery while the battery voltage is smaller than a first voltage threshold $V1$ and/or while the battery temperature is smaller than a first temperature threshold, said first charging current being smaller than a second charging current $I2$. The first step preferably ends if the battery voltage is exceeding said first voltage threshold $V1$ and/or said first temperature threshold. Accordingly, in case of low ambient temperature (and thus high internal resistance of the battery) the process starts with low charging current compared to the normal charging currents, e.g. $\frac{1}{10}$ of the normal charging current applied in one or more of the following steps. Also a charging current of $\frac{1}{5}$ or even $\frac{1}{3}$ of the normal charging current applied in one or more of the following steps might be considered as small charging current in the context of the invention. It is also advantageous for the lifetime of the battery to start the charging of a highly discharged battery with said small charging current.

If the criteria for the first charging step are not met, the charging might—upon checking the criteria for second charging step—directly start with the second charging step, as described in the following.

a second charging step following in particular directly to said first step and applying said second constant charging current $I2$ to the battery while the battery voltage is higher than said first battery voltage threshold $V1$ and lower than a second battery voltage threshold $V2$ and while the battery temperature is higher than said first temperature threshold and smaller than a second temperature threshold. According to the invention, the second charging step might end if the battery voltage is equal to or is exceeding said second voltage threshold $V2$ and/or if the battery temperature is equal to or is exceeding said second temperature threshold. The second voltage and temperature thresholds are higher than the respective first voltage and temperature thresholds. The second temperature threshold might correspond to a maximum allowed charging temperature of the battery. The second voltage threshold V2 may correspond to a maximum allowed charging voltage or be lower than a third voltage threshold V3 being defined as a maximum allowed charging voltage of e.g. lithium-ion-batteries. At the end of the second step said second constant charging current is switched off.

a third charging step following in particular directly to said second step and applying a constant charging current I3 to the battery. This constant charging current I3 might in particular be higher than said first constant charging current I1 and lower than or preferably equal to said second constant charging current I2, wherein said third constant charging current I3 is switched on every time when the battery voltage drops to a fourth voltage threshold V4 and switched off again, when the battery voltage reaches a fifth voltage threshold V5. Said fifth voltage threshold V5 might be in particular higher than said fourth voltage threshold V4 and lower than or preferably equal to said second voltage threshold V2. Said fourth voltage threshold V4 is preferably higher than the first voltage level V1 and might be lower than any other voltage level, e.g. V2, V5. Said third charging step accordingly provides said repeated switching on and off the third constant charging current I3 thereby producing current pulses Ton. A criterion for the end of the third charging step is if the length of a current pause Toff following said current pulse Ton, i.e. the time durance of the constant charging current I3 continuously switched on, equals or exceeds the length of $p \cdot (k-1)$–times the preceding current pulse Ton with k being the ratio of constant charging current I3 and the constant charging current I1 and p being a defined factor.

The factor p expresses that said threshold given by $p \cdot (k-1)$–times the preceding current pulse Ton is not a strict but a roughly defined threshold. In a preferred embodiment, the factor p can be taken from the range [0.9, . . . , 1.1] and/or include all possible values within a ranged defined by a lower limit $p_{low}$ and a higher limit $p_{high}$, i.e. $\in [p_{low}, \ldots, p_{high}]$.

If current I3 is considered a high constant charging current and current I1 is considered a low constant charging current, said criterion for ending said third step is defined by the average current covering the period of a current pulse and the subsequent current pause is getting lower than the low constant charging current I1. This criterion ensures that the battery is charged with the highest possible velocity for charging.

According to a preferred embodiment, a fourth charging step can be provided following in particular directly said third step and applying said first constant charging current I1 to the battery while the battery voltage being lower than a sixth battery voltage threshold V6.

One major advantage of the proposed method for charging a rechargeable battery is, that in this fourth charging step the battery is charged with the small (first) constant charging current I1. Due to this small charging current, higher charging states can be reached compared to the application of a higher charging current. If the first charging current I1 is in the order of the final charging current of a conventional cc-cv-charging method, a lithium-ion-battery might reach a charging capacity of almost 100%.

Another advantage of applying this small (first) constant charging current I1 is that the lowering of the charging capacity due to the deterioration of the battery (aging) and/or low temperature can be at least partly compensated. The lower charging current compensates an increasing internal resistance such that the voltage drop across the internal resistance is reduced due to the lower current.

Preferably, the fourth step ends if the battery voltage is equal to or exceeds said sixth battery voltage threshold V6. When reaching this sixth battery voltage threshold V6, the battery is completely charged. Preferably, said sixth battery voltage threshold V6 is lower than said second battery voltage threshold V2 and/or said fifth battery voltage threshold V5. Further, said sixth battery voltage threshold V6 is preferably higher than said first battery voltage threshold V1 and/or said fourth battery voltage threshold V4.

In order to compensate a possible discharging current of the battery, even without active use of the electric device, a fifth charging step might be provided following in particular directly said third step or forth step. During that fifth charging step constant charging current pulses are applied to the battery. The switching on and off of the constant charging current pulses might occur time controlled. The duration and/or ratio of the pulse on- and pulse off-times might be constant or variable depending on other parameters such as battery temperature. The constant charging current pulses might apply preferably said small charging current I1.

According to another embodiment said constant charging current pulse in the fifth charging step might be switched on, if the battery voltage drops below a seventh battery voltage threshold V7, and switched off, if the battery voltage exceeds an eighth battery voltage threshold V8. The seventh battery voltage threshold V7 might preferably be higher than first V1 and lower than the eighth V8 battery voltage threshold. Further, the seventh battery voltage threshold V7 might be higher than the fourth battery voltage threshold V4. The eighth voltage battery threshold V8 is lower than the third battery voltage threshold V3 defining according to a preferred embodiment the maximum allowed charging current. Further, the eighth voltage battery threshold V8 might be lower than the second V2, the fifth V5, the sixth V6 and/or the seventh V7 battery voltage threshold.

In order to stop the third charging step with the high (second) charging current I2 and start charging with a lower charging current I1, there might be several supplemental criteria used as a stop criterion for the third charging step. The following criteria might be used alternatively and/or in any combination:

a defined duration of time has elapsed since the beginning of the third and/or the second charging step, e.g. 1 hour since the start of the first charging step and/or 3 hours since the start of the second charging step.

the length of a current pause (Toff) and/or the length of a current pulse (Ton) in said third charging step is exceeding a defined threshold.

the ratio of the duration of a current pause (Toff) and a current pulse (Ton) traverses a defined threshold.

the ratio of the duration of two successive current pulses (Ton(n)/Ton(n+1)) and/or the ratio of two successive current pauses (Toff(n)/Toff(n+1)) traverses a defined threshold.

the ratio of the duration of one current pulse to the first current pulse (Ton(n)/Ton(1)) and/or the ratio of one current pause to the first current pause (Toff(n)/Toff(1)) traverses a defined threshold.

For all voltage and/or temperature thresholds, the action described before when reaching this threshold can be performed when the value measured equals this threshold or when the value traverses this threshold, i.e. exceeds or underruns this threshold. Both meanings are covered with the definitions described before and/or claimed. This is evident to the one skilled in the art as all thresholds mentioned in this description define a certain range of threshold which can be varied without leaving the scope of the invention.

According to a preferred embodiment, the first charging current I1 might be about $\frac{1}{10}$ C and/or the second charging current I2 might about 1 C. However, the invention is not limited to these preferred values. The one skilled in the art is able to choose suited currents and/or voltage thresholds for a specific appliance. It is nevertheless preferred that the first (smaller) charging current I1 is at least the half (or preferred less) of the second (higher) charging current I2. A preferred ratio of the first to the second charging current is between 5% to 30%, and in particular between 10% and 20%.

The invention also relates to an apparatus having a charger, a rechargeable battery to be charged by said charger and a processor with a memory, the processor being adapted to control the charging of the battery. The processor is adapted to perform the method as described before or parts thereof. According to preferred appliances, said apparatus is an electric toothbrush, epilator, mixer and/or an electric shaver.

According to one specific embodiment of the invention, said charger may be integrated in a docking station of said apparatus. A docking station is defined as a unit separate from the apparatus. The apparatus might be coupled (or is coupleable) to the docking station, e.g. for cleaning and/or charging. If coupled to the docking station, the apparatus is considered one unit with the docking station having by a mechanical and/or electrical engagement.

Finally, the invention relates to a computer program product having program code means which are stored on a computer-readable medium in order to carry out the method as described before or parts thereof if the computer program product is executed on a processor of an apparatus having a charger, a rechargeable battery to be charged by said charger, said processor being connected or equipped with a memory.

DETAILED DESCRIPTION OF THE INVENTION

Figure 1:
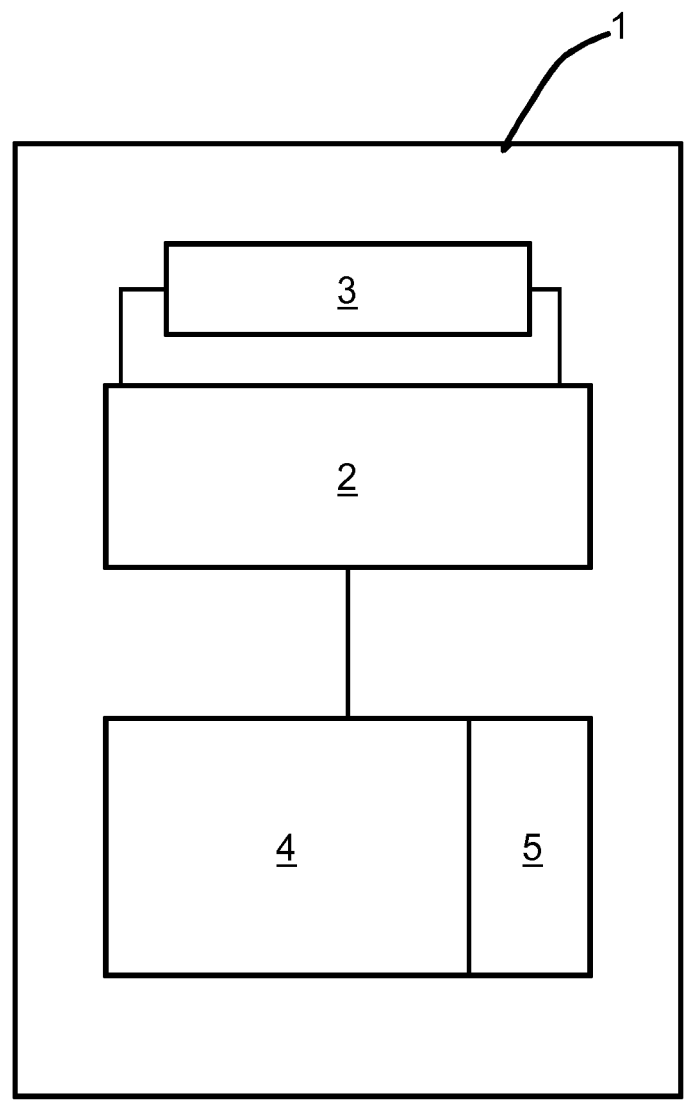
FIG. 1 shows a schematic view of a preferred embodiment of the apparatus according to the present invention.

According to a preferred embodiment of the electric device an apparatus 1 is proposed having a charger 2, a rechargeable battery 3 to be charged by said charger 2 and a processor 4 with a memory 5, the processor 5 being adapted to control the charging of the battery 3. The processor 2 is adapted to perform the method for charging a rechargeable battery of an electric device as described later for a specific embodiment.

The apparatus 1 might be an electric toothbrush, an epilator, a mixer, an electric shaver or the like appliance used regularly in daily life for quite a short period during the day. The use of the appliance for quite a short period during the day means that a typical use of the appliance lasts 1 to 5 or 1 to 15 minutes. Further, the appliance might be used once a day or a few times a time, the number of usage per day typically not exceeding 5 to 10 or 15.

Figure 2:
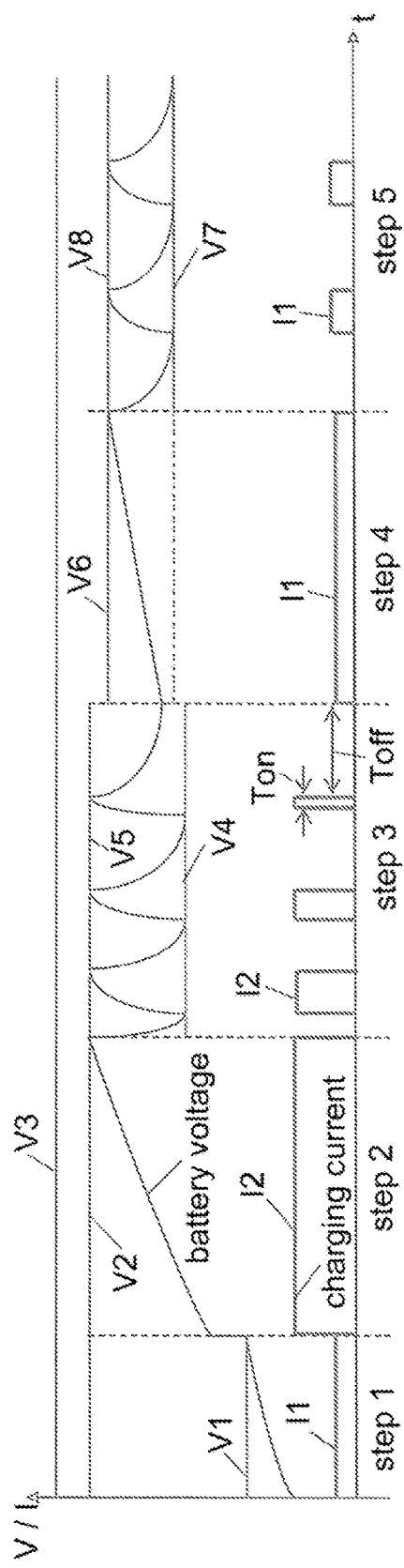
FIG. 2 shows an overview of a preferred embodiment of the method for charging a rechargeable battery of the electric apparatus.

According to an embodiment not shown, the charger might be integrated in a separate docking station for the apparatus. However, when the apparatus is inserted into the docking station, docking station and apparatus are considered one unit for performing In FIG. 2, a time diagram is shown representing an overview of a preferred embodiment of the proposed method for charging the rechargeable battery 3 of the apparatus 1. The diagram presents besides charging steps 1 to 3 also the optional charging steps 4 and 5. However, the proposed method can also be realized using only the charging steps 1 to 3.

The charging method can be initiated by connecting the apparatus 1 to the mains by a separate wire or by inserting the apparatus 1 into a docking station (not shown). Then, the processor 4 initiates the charging process and activates the charger 2.

During the first charging step 1, the battery voltage and the battery temperature are measured. To this aim, the processor 4 might be a microprocessor equipped with suited sensor ports for measuring a voltage and a temperature. Alternatively, the processor 4 can be connected to a suited sensor circuitry (not shown). If the battery voltage is smaller than a first voltage threshold V1 and/or if the battery temperature is smaller than a first temperature threshold, a first constant charging current I1 applied to the battery 3 by the charger 2. This first step 1 ends if the battery voltage is exceeding the first voltage threshold V1 and/or the first temperature threshold.

Following the first charging step 1 a second constant charging current I2 is applied to the battery 3 in the second charging step 2. The second charging current I2 is higher than the first charging current I1. For example, the first charging current I1 is $\frac{1}{10}$ C, while the second charging current is 1 C. During this second charging step, the battery voltage is continuously increasing with transporting charge into the battery with the charging current. The second charging step ends if the battery voltage is equal to or is exceeding said second voltage threshold V2. As a heat protection, the second charging step 2 is also stopped, if the battery temperature is equal to or is exceeding a second temperature threshold. A respective temperature control might be realized by a separate temperature sensor connected to the processor 2 to be able to compare the actual temperature of the battery with one or more temperature thresholds. It is, however, also possible that a temperature control is included into the rechargeable battery 3 itself. The second voltage threshold V2 may correspond to a maximum allowed charging voltage or be lower than a third voltage threshold V3 being e.g. defined as a maximum allowed charging voltage of lithium-ion-batteries. At the end of the second charging step 2 said second constant charging current I2 is switched off.

In the following third charging step 3 a third constant charging current I3 is applied to the battery. Preferably, this third constant charging current I3 is equal to the second charging current I2. The third constant charging current I3 is switched on every time when the battery voltage drops to or below a fourth voltage threshold V4 and switched off when the battery voltage reaches a fifth voltage threshold V5. This switched on and off of the third charging current I3 is repeated thereby producing current pulses. This third charging step ends if the length of a current pause (Toff) following a current pulse (Ton) equals or exceeds the length of p·(k−1)-times the preceding current pulse (Ton) with k being the ratio of constant charging current I3 and the constant charging current I1 and p being a defined factor, preferably in the range between 0.9 and 1.1. As already described there may be other supplemental criteria for stopping this third charging step.

In order to make use of the almost complete capacity of the battery, in a fourth charging step a smaller constant charging current, in particular the first constant charging current I1, can be applied to the battery 3 while the battery voltage being lower than a sixth battery voltage threshold V6. This allows charging even if the internal resistance of the battery 3 is increasing.

In a final fifth charging step constant charging current pulses might be to the battery applied to the battery to compensate for a possible self-discharging current of the battery. Said constant charging current pulses in the fifth charging step might be switched on, if the battery voltage drops below a seventh battery voltage threshold V7, and switched off, if the battery voltage reaches or exceeds an eighth battery voltage threshold V8. This fifth charging step might continue until the apparatus 1 is disconnected from the mains. The constant charging current of the charging pulses preferably corresponds to the smaller first charging current I1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for charging a rechargeable battery of an electric device in different charging steps applying different charging currents, said charging steps comprising:
   a first charging step applying a first constant charging current to the battery while at least one of the conditions apply: 1) the battery voltage is smaller than a first voltage threshold, 2) while the battery temperature is smaller than a first temperature threshold, and both conditions 1) and 2), said first constant charging current being smaller than a second constant charging current;
   a second charging step applying said second constant charging current to the battery at least one of the conditions apply: a) while the battery voltage is higher than said first battery voltage threshold and lower than a second battery voltage threshold, b) while the battery temperature is higher than said first temperature threshold and smaller than a second temperature threshold, and both conditions a) and b);
   a third charging step applying a third constant charging current to the battery, wherein said third constant charging current is switched on every time when the battery voltage drops to a fourth voltage threshold and switched off when the battery voltage reaches a fifth voltage threshold, and wherein said third charging step providing repeated switching on and off the third constant charging current thereby producing current pulses will end if the length of a current pause following said current pulse equals or exceeds the length of p−(k−1)-times the preceding current pulse, with k being the ratio of the first constant charging current and the second constant charging current and p being a defined factor, further comprising a supplemental criterion for the end of the third charging step, wherein said supplemental criterion comprises at least two of the following conditions:
   a defined duration of time has elapsed since the beginning of the third and/or the second charging step;
   the length of a current pause and/or the length of a current pulse in said third charging step exceeds a defined threshold:
   the ratio of the duration of a current pause and a current pulse traverses a defined threshold;
   the ratio of the duration of two successive current pulses and/or the ratio of two successive current pauses traverses a defined threshold; and
   the ratio of the duration of one current pulse to the first current pulse and/or the ratio of one current pause to the first current pause traverses a defined threshold.

2. The method according to claim 1, further comprising a fourth charging step applying said first constant charging current to the battery while the battery voltage being lower than a sixth battery voltage threshold.

3. The method according to claim 2, further comprising a fifth charging step applying constant charging current pulses to the battery.

4. The method according to claim 1, wherein the first constant charging current is about 1/10 C.

5. The method according to claim 1, wherein the second constant charging current is about 1 C.

6. An apparatus having a charger, a rechargeable battery to be charged by said charger and a processor with a memory, the processor being adapted to control the charging of said battery, characterized in that the processor is adapted to perform the method as described in claim 1.

7. The apparatus according to claim 6, wherein said apparatus is an electric toothbrush, epilator, mixer and/or an electric shaver.

8. The apparatus according to claim 6, wherein said charger is integrated in a docking station of said apparatus.

9. The apparatus according to claim 1, wherein said supplemental criterion comprises more than two of said conditions.

* * * * *